FOUR-TERMINAL NETWORKS

Filed Oct. 8, 1954

Inventor

Harry Maurice O'Donovan

By

Holcombe, Wetherill & Brisebois

Attorney

United States Patent Office 2,921,275

Patented Jan. 12, 1960

2,921,275

FOUR-TERMINAL NETWORKS

Harry Maurice O'Donovan, Cambridge, England, assignor to Pye Limited, Cambridge, England, a British company Application October 8, 1954, Serial No. 461,221

Claims priority, application Great Britain November 2, 1953

5 Claims. (Cl. 333—28)

Figure 1:
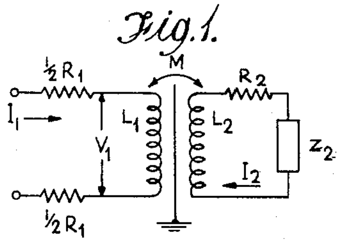
Figure 2:
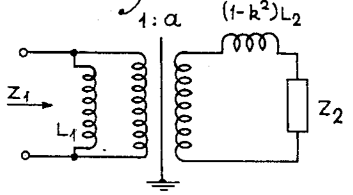

The present invention relates to four-terminal networks and more particularly to four-terminal networks which are suitable for use as matching devices.

It is sometimes desirable to provide an easy means for adjusting the balance of a four-terminal network, particularly where it is used as a matching device in signal distribution systems. With such arrangements the distributed signal may only be of the order of millivolts whilst stray pick-up on the distribution line may amount to several tens of volts. Thus very accurate balance of the network is needed to avoid considerable losses.

It is an object of the present invention to provide a four-terminal network which can serve as a matching device for the correct feeding into, or termination of a signal distribution line and in which the balance of the network can be accurately and easily adjusted.

According to the present invention, a four-terminal network comprises a transformer and an adjustable reactance connected in series with the input to and/or the output from said transformer for adjusting the balance of said network.

According to a feature of the invention the adjustable reactance and transformer leakage inductance are incorporated into the network in such a way as to maintain a good matching and frequency response over the desired frequency range. The circuit also includes compensating means for the losses caused by the balancing circuit, so that the frequency response of the network is flat and the effective load resistive.

The adjustable reactance may comprise an inductance or inductances connected in series with the primary and/or secondary of the transformer and usually arranged closely adjacent thereto. In a preferred arrangement the adjustable reactance comprises two coils respectively connected in series with one of the two input leads to the primary or one of the two output leads from the secondary of the transformer and having a common adjustable magnetic or conductive core which can be moved relative to the two coils. The spacing of the two coils and the length of the core are chosen such that when the core is moved, the inductance of one coil increases as the inductance of the other coil decreases, and by substantially the same amount, and thus the total inductance of the two coils connected in series remains very nearly constant. Alternatively, the adjustable reactance may comprise one or more variable condensers, either alone or in combination with the variable inductances.

Where intended for radio-frequency applications, the transformer of the four-terminal network is preferably constructed with separate primary and secondary windings and has an electrostatic shield arranged therebetween.

From another aspect therefore, the invention consists in a four-terminal network comprising a transformer having separate primary and secondary windings and an electrostatic shield between said windings and means for adjusting the balance of the network comprising an adjustable reactance connected in series with the primary and/or secondary winding of said transformer, said adjustable reactance and the leakage inductance of said transformer being incorporated into the network to provide a good matching and frequency response over the desired frequency range.

Furthermore, in four-terminal networks intended for use at radio frequencies a condenser is preferably connected in series with each input lead and forms part of the electrical design of the network. These condensers, which may be variable, serve to prevent low-frequency currents such as audio frequency currents, or direct currents, from acting upon the circuit to which the four-terminal network is connected or from being shorted by it and thus constitute an insulating safety device.

The invention will be further described with reference to the accompanying drawings, in which:

Figures 1 to 4 are explanatory circuits showing developments in the design of the four-terminal networks, and Figures 5 to 8 illustrate respectively the circuits of four different embodiments of four-terminal network according to the invention.

If the four-terminal network is to comprise a radio-frequency input matching device, for example, to be used for matching a transmission line to the input of a valve, the following factors should be taken into consideration.

(1) The two output terminals of the network are to be connected between the grid and cathode of a valve, the input capacity of which is to be incorporated into the circuit.

(2) The two input terminals are to present a balanced and nearly resistive impedance providing a correct termination to a specified balanced transmission line, with good practical accuracy.

(3) The circuit must transmit evenly all frequencies within a specified range with good engineering accuracy and a reasonable phase shift.

(4) An electrostatic shield must be provided between the transmission line and the input grid.

(5) A simple means of adjusting the balance of the incoming line and of the input circuit must be provided.

(6) Two condensers are incorporated, one in series with each input lead. These form part of the electrical design and at the same time, they prevent low frequency currents such as direct mains supplies, audio frequency currents, etc., from acting upon the input circuit, or from being shorted by it, and constitute thereby an insulating safety device.

The main component of the input circuit is a shielded transformer (it could be an autotransformer where shielding is not necessary).

In Figure 1, there is represented by:

$L_1$ the inductance of the primary
$L_2$ the inductance of the secondary
$M$ their coefficient of mutual inductance
$k$ their coefficient of coupling ($k^2=M^2/L_1\times L_2$)
$R_1$ the resistance of the primary
$R_2$ the resistance of the secondary
$Z_2$ any impedance connected between the secondary terminals
$V_1$ a sinusoidal difference of potential maintained between the primary terminals of angular velocity $w=2\pi f$ where $f$ is the frequency
$I_1$ the current through the primary
$I_2$ the current through the secondary
$Z_1$ the impedance presented by the primary terminals as shown on Fig. 1

These letters represent the complex values in common use in electrical engineering. The positive direction chosen along the primary and secondary circuits are such that $M<0$. Then, the difference of potential applied to the primary and the E.M.F. induced into the secondary are in phase.

Then $$V_1-(R_1+jwL_1)I_1-jwMI_2=0$$
$$-jwMI_1-(R_2+jwL_2+Z_2)I_2=0$$

From now on $R_2$ will be included in $Z_2$ and $-V_1$ will designate the inductive E.M.F. to which the potential drop due to $R_1$ must be added in order to obtain the potential difference between the input terminals. (In a good transformer $R_1$ and $R_2$ are negligible when compared to the other impedances.)

Then $$V_1=jwL_1I_1+jwMI_2$$
$$0=jwMI_1+(jwL_2+Z_2)I_2$$

Solving and taking $$Z_1=\frac{V_1}{I_1}$$

$$Z_1=jwL_1\frac{jwL_2(1-k^2)+Z_2}{jwL_2+Z_2}$$

$$\frac{1}{Z_1}=Y_1=\frac{1}{jwL_1}+\frac{1}{\frac{1}{a^2}[jwL_2(I-k^2)+Z_2]}$$

$$a^2=\frac{k^2L_2}{L_1}$$

or $$a=k\sqrt{\frac{L_2}{L_1}}$$

is the actual ratio of the transformer. The expression for $Y_1$ shows that the circuit is equivalent to an inductance $L_1$ in parallel with the primary of an ideal transformer of ratio $a$, an inductance equal to $(1-k^2)L_2$ in series with the impedance $Z_2$ being connected between the secondary terminals, as shown on Fig. 2.

The ideal transformer has a ratio equal to $a$, $k=1$ and its primary and secondary inductances are infinite. It will be shown in all following figures.

Figure 3:
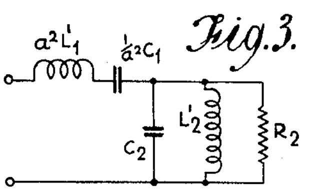
Figure 4:
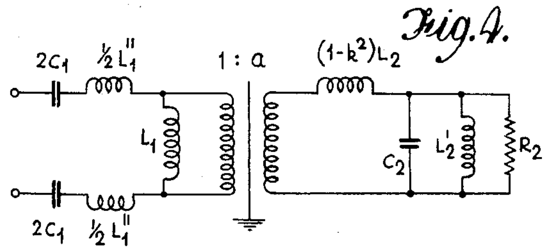

The leakage inductance $(1-k^2)L_2$ and the valve input capacity and winding self capacities are now included in a band-pass filter network in order to comply with the requirements stated above. A half section provides the simplest design. The same principles apply to a low-pass filter according to the invention. The classical theory of electrical filters being well known the following will be assumed:

$Z_2$ consists of the valve input capacity and secondary winding self capacity, amounting to $C_2$ in parallel with an inductance $L_2$ and a resistance $R_2$. To this must be added a series resonant branch consisting of an inductance $a^2L'_1$ and a capacity $$\frac{1}{a^2}C_1$$

in series, see Figure 3.

The leakage inductance $(1-k^2)L_2$ is part of $a^2L'_1$. The impedance of the network can be transferred to the primary side by multiplying the impedance of any transferred component by $$\frac{1}{a^2}$$

$(1-k^2)L_2$ is better left on the secondary side and $a^2L'_1-(1-k^2)I_2=a^2L''_1$ transferred to the primary side together with $$\frac{1}{a^2}C_1$$

Each impedance is split into two half-impedances since the primary circuit is supposed to be balanced. The result is shown on Figure 4 where $$L''_1=L'_1-\frac{1-k^2}{a^2}L_2$$

The numerical design follows closely that of an ordinary electrical filter. $C_2$ is imposed by the valve wiring and winding capacities. The frequency band required is given. From this $L_2$ and $R_2$ are computed as well as $a^2$ is deduced from $a$ the ratio of $R_2$ to the impedance of the source feeding the input circuit. This is generally a length of transmission line.

Figure 5:
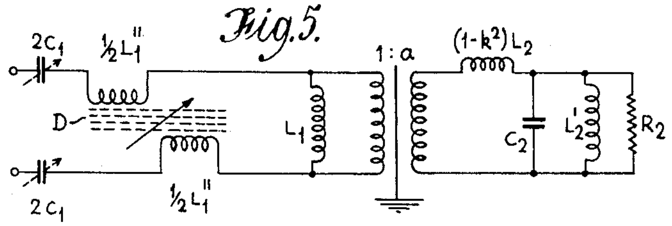
Figure 6:
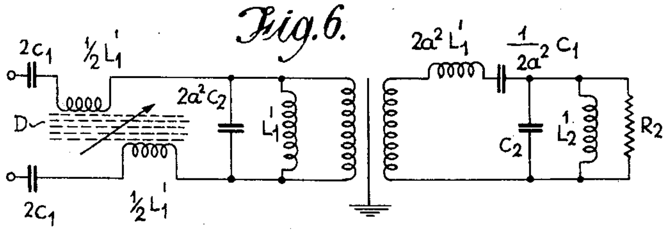

It is now necessary to provide an easy means of adjusting the circuit balance. This is done by winding the two coils $L'_1$ and $L''_1$ in series with the primary leads and upon the same former inside which is arranged an adjustable magnetic or conductive core D which can be moved towards one winding or the other. The spacing of the two coils and the length of the core are chosen such that the total inductance of the two coils connected in series remains very nearly constant when the core is moved, because the inductance of one increases by the same amount as the inductance of the other one decreases. The circuit is shown in Figure 5. The material of the core depends mainly upon the frequency range considered. The series condensers could also be made adjustable as indicated by the broken arrows on condensers $2C_1$. Where the condensers are made variable as well, it enables two variable quantities to be disposed of in the design. Furthermore it allows adjustment of the phase of the signals. Usually the condensers are independently variable although they could be gauged where only a narrow range of adjustment is required.

In the circuit of Figure 5, the inductance of the primary must be great enough to present a small admittance at the considered frequencies. It is possible to remove this condition by incorporating the primary into a complete filter cell in which $L_1$ provides one of the parallel inductances. The series inductance must then be on the secondary side and equal to $2L'_1\times a^2$. A half cell is added on the primary side to provide the balancing network. The circuit is more difficult to adjust than the previous one. The circuit is shown on Figure 6. It may be necessary to connect an inductance in parallel with $L_1$ and another one in series with $(1-k^2)L_2$.

Figure 7:
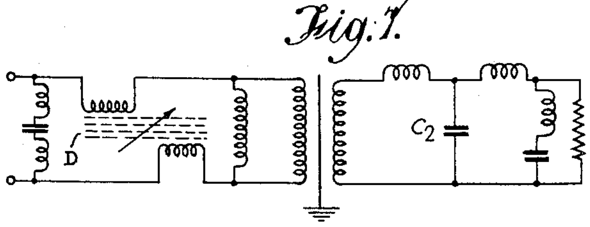

All that has been stated above concerning radio-frequency band-pass filters applies to low pass filters with some modifications. Figure 7 shows an input circuit designed as an M-derived low pass filter in the standard way.

In all previous examples of band-pass filters constant $k$ sections have been considered. The impedance of such sections may vary more than is permissible inside the required range of frequencies. In such cases the correct procedure is to design the constant $k$ filter as a first approximation and compute or measure the variations of its impedance. From these, slight modifications of its load and reactances may bring the required result. The advantage of M-derived filters is often rather theoretical only, especially at high frequencies.

Figure 8:
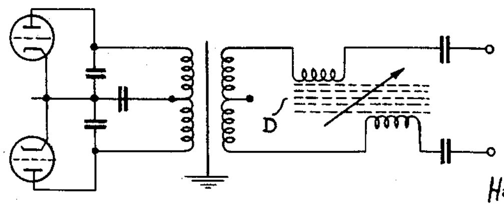

The same principles apply to the design of output circuits and an example of a band-pass circuit is shown in Figure 8. The load or the input terminals of a terminated transmission line provide the filter termination. Here, the valve anode capacities, wiring capacities, windings self-capacities constitute the filter parallel capacity. The secondary leakage inductance is included in the series inductances. The primary constants are computed from a knowledge of $C_1$ and of the required bandwidth. The ratio of the transformer depends upon the impedance of the load. This determines the constant of the secondary circuit. Coupled series inductances with an adjustable core D can be used in the secondary circuit to balance the output to the transmission line or load as before. In the circuits described, the variable inductances are arranged closely adjacent to the transformer, for example within one inch at an operating frequency of 20 mc./s. The inductances are also arranged so that the flux from the transformer cuts the coils at right angle so as not to affect the effective reactance. Alternatively or additionally the transformer can be totally shielded or wound as a toroidal coil.

The four-terminal networks according to this invention may be advantageously employed in signal distribution systems, such as television relay systems, for matching the central distribution station to a transmission line, and for matching terminal receivers to the transmission line.

I claim:

1. A circuit arrangement for the distribution of radio frequency signals over a desired frequency band, comprising a twin distribution line, a wide band transformer having a first winding, a second winding and an electrostatic shield between said windings, one of said windings being connected across the two conductors of said line and the other of said windings being connected to a load, a point of fixed potential to which said electrostatic shield is connected, and means for balancing said distribution line with respect to said point of fixed potential, said balancing means comprising a first coil connected in series between one conductor of said distribution line and one end of one winding of said transformer, a second coil connected in series between the other conductor of said distribution line and the other end of said one winding of the transformer, a common core member about which said first and second coils are disposed and adjustable relative to said first and second coils so as to vary the inductance of said coils and arranged so that the inductance of one coil increases as the inductance of the other coil decreases and by substantially the same amount.

2. A circuit arrangement for the distribution of television signals, comprising a twin distribution line, a wide band transformer having a first winding, a second winding and an electrostatic shield between said windings, one of said windings being connected across the two conductors of said line and the other of said windings being connected to a load, a point of fixed potential to which said electrostatic shield is connected, and means for balancing said distribution line with respect to said point of fixed potential, said balancing means comprising a first coil connected in series between one conductor of said distribution line and one end of one winding of said transformer, a second coil connected in series between the other conductor of said distribution line and the other end of said one winding of the transformer, said first and second coils being arranged closely adjacent to the transformer and so that the flux from said transformer cuts said coils at right angles a common magnetic core member about which said first and second coils are disposed and adjustable relative to said first and second coils so as to vary the inductance of said coils and arranged so that the inductance of one coil increases as the inductance of the other coil decreases and by substantially the same amount.

3. A circuit arrangement for the distribution of radio frequency signals over a desired frequency band, comprising a twin distribution line, a condenser connected in series with each conductor of said twin distribution line, a wide band transformer having a first winding, a second winding and an electrostatic shield between said windings, one of said windings being connected across the two conductors of said line and the other of said windings being connected to a load, a point of fixed potential to which said electrostatic shield is connected, and means for balancing said distribution line with respect to said point of fixed potential, said balancing means comprising a first coil connected in series between one conductor of said distribution line and one end of one winding of said transformer, a second coil connected in series between the other conductor of said distribution line and the other end of said one winding of the transformer, a common magnetic core member about which said first and second coils are disposed and adjustable relative to said first and second coils so as to vary the inductance of said coils and arranged so that the inductance of one coil increases as the inductance of the other coil decreases and by substantially the same amount.

4. A circuit arrangement for the distribution of television signals comprising a twin distribution line, a condenser connected in series with each conductor of said twin distribution line, a wide band transformer having a first winding, a second winding and an electrostatic shield between said windings, one of said windings being connected across the two conductors of said line and the other of said windings being connected to a load, a point of fixed potential to which said electrostatic shield is connected and means for balancing said distribution line with respect to said point of fixed potential, said balancing means comprising a first coil connected in series between one conductor of said distribution line and one end of one winding of said transformer, a second coil connected in series between the other conductor of said distribution line and the other end of said one winding of the transformer, said first and second coils being arranged closely adjacent to the transformer and so that the flux from said transformer cuts said coils at right angles a common core member about which said first and second coils are disposed and adjustable relative to said first and second coils so as to vary the inductance of said coils and arranged so that the inductance of one coil increases as the inductance of the other coil decreases and by substantially the same amount.

5. A circuit arrangement for the distribution of radio frequency signals over a desired frequency band, comprising a twin distribution line, a wide band matching transformer for matching a load to said distribution line, and having a first winding, and a second winding, one of said windings being connected across the two conductors of said line, and an electrostatic shield between said first and second windings, a condenser connected in series with each conductor of said twin distribution line a point of fixed potential to which said electrostatic shield is connected, and means for balancing said distribution line with respect to said point of fixed potential, said balancing means comprising a first coil connected in series between one conductor of said distribution line and one end of one winding of said transformer, a second coil connected in series between the other conductor of said distribution line and the other end of said one winding of the transformer, a common core member about which said first and second coils are disposed and adjustable relative to said first and second coils so as to vary the inductance of said coils and arranged so that the inductance of one coil increases as the inductance of the other coil decreases and by substantially the same amount.

References Cited in the file of this patent

UNITED STATES PATENTS

| | | |
|---|---|---|
| 1,430,808 | Hoyt | Oct. 3, 1922 |
| 1,752,046 | Whittle | Mar. 25, 1930 |
| 1,940,437 | Osnos | Dec. 19, 1933 |
| 2,135,037 | Landon | Nov. 1, 1938 |
| 2,204,721 | Blumlein | June 18, 1940 |
| 2,301,245 | Bode | Nov. 10, 1942 |
| 2,333,148 | Botsford | Nov. 2, 1943 |
| 2,356,446 | Campbell | Aug. 22, 1944 |
| 2,362,549 | Hale | Nov. 14, 1944 |
| 2,477,475 | Braden | July 26, 1949 |
| 2,669,697 | Olesen | Feb. 16, 1954 |
| 2,740,941 | Kelly | Apr. 3, 1956 |

FOREIGN PATENTS

| | | |
|---|---|---|
| 315,842 | Italy | Mar. 9, 1934 |
| 844,098 | France | Apr. 11, 1939 |